United States Patent [19]
Yoshioka et al.

[11] Patent Number: 5,587,216
[45] Date of Patent: Dec. 24, 1996

[54] OPTICAL RECORDING MEDIUM

[75] Inventors: Kazumi Yoshioka, Yawata; Takeo Ohta, Nara; Shigeaki Furukawa, Nara-ken; Katsumi Kawahara, Kadoma, all of Japan

[73] Assignee: Matsushita Electric Industrial Co., Ltd., Osaka-fu, Japan

[21] Appl. No.: 329,682

[22] Filed: Oct. 26, 1994

Related U.S. Application Data

[63] Continuation of Ser. No. 962,112, Oct. 16, 1992, abandoned.

[51] Int. Cl.⁶ .................................. B32B 3/02; G11B 5/66
[52] U.S. Cl. .................. 428/64.4; 428/64.6; 428/64.9; 428/336; 428/694 DE; 428/684 XS; 428/694 RL; 428/900; 369/13
[58] Field of Search ................. 428/694 DE, 694 XS, 428/694 RL, 900, 64, 64.4, 64.6, 64.9, 336; 369/13

[56] References Cited

U.S. PATENT DOCUMENTS

| | | | |
|---|---|---|---|
| 3,530,441 | 1/1969 | Ovshinsky | 365/113 |
| 4,569,881 | 2/1986 | Freese et al. | 428/213 |
| 4,792,474 | 12/1988 | Murakami et al. | 428/64.7 |
| 4,847,132 | 7/1989 | Takao et al. | 428/64.6 |

FOREIGN PATENT DOCUMENTS

| | | |
|---|---|---|
| 19545 | 1/1989 | Japan . |
| 286434 | 12/1991 | Japan . |
| 10979 | 1/1992 | Japan . |

*Primary Examiner*—Leszek Kiliman
*Attorney, Agent, or Firm*—Wenderoth, Lind & Ponack

[57] ABSTRACT

An optical recording medium capable of recording, reproducing and erasing information wherein a pulsating phenomenon where dielectric layer provided on the top and bottom of the recording thing film layer are thermally expanded, and contracted through the recording and erasing so that an inferior phenomenon of moving the recording thin film layer along the guiding groove in the disc rotating direction is considerably restrained, whereby, uneven thickness in the recording thin film layer is removed, thus making it possible to prevent the signal quality from being deteriorated, and the repeating characteristics of the recording and erasing operations are exceptionally improved.

2 Claims, 1 Drawing Sheet

OPTICAL RECORDING MEDIUM

This application is a continuation of now abandoned application, Ser. No. 07/962,112, filed Oct. 16, 1992.

BACKGROUND OF THE INVENTION

The present invention generally relates to an optical recording medium capable of recording, reproducing and erasing information with high density and mass by laser beams.

An optical disc as the optical recording medium is classified into a postscript type disc and a rewriting type disc in accordance with a recording thin film to be used. In the postscript type disc, a record reproducing operation can be effected. Once data are stored, the record cannot be erased so that the data cannot be stored again. In the rewriting type disc, data can be rewritten many times on the same data region.

In the postscript type disc, data are recorded on a recording thin film by the irradiation of laser lights. The data are reproduced by detection of the variation in the quantity of light reflected from the recording thin film with a photo diode. The recording thin film to be used here is a thin film made of a TeOx (0<x<2.0) component chiefly composed of Te and $TeO_2$. The condition of the film is changed from an amorphous condition to a crystal condition by a rise in a film temperature caused by the irradiation of the laser lights. The recording operation of the data is effected with the use of the phenomenon. The recording thin film cannot be changed from the crystal condition to the amorphous condition. Although the record reproducing operation can be effected in the postscript disc, the rewriting (overwriting) operation cannot be effected.

The optical magnetic recording disc and the phase change recording disc are the main types of overwrite discs. In the optical magnetic recording disc, a magnetic thin film which is an amorphous alloy film composed of rare earth transition metal is used as a recording thin film. In the magnetic thin film, the film temperature rises, and coercive force reduces in a portion upon which the laser rays are irradiated. When a weak external magnetic field has been given to such a magnetic thin film, the portion is retained as a spot shaped magnetic area with magnetizing inversion being caused. The data are recorded by this use of the phenomenon. In the reproducing operation, the polarized face of the laser light is rotated by the magnetization direction. Laser lights of a power weaker than at the recording time are irradiated upon the magnetic thin film with the use of such phenomenon so as to detect the varied condition of the polarized face of the laser light. The detecting operation is effected with the use of an element called an analyzer which measures the change in the condition of the polarized face in the laser lights. As the condition can be restored to the original one by the provision of a strong magnetic field in the above described spot shaped magnetic area magnetically inverted, the overwriting operation can be effected.

The recording disc is normally orbicular in shape. It is used by the rotation thereof. In the phase change recording disc, the laser lights are throttled to approximately 1 μm and are modulated in strength in accordance with the information being imparted to the disc, with the recording thin film being previously crystallized, the laser lights are irradiated. In this case, a peak power laser light irradiation portion is heated, fused to a fusing point or higher of the recording thin film, and thereafter, is quenched. An amorphous mark is formed on the recording thin film in this manner. The information is recorded with such a mark being provided as a recording mark.

The laser lights are likewise irradiated with respect to the record mark in the amorphous condition formed on the record thin film so as to effect the heating operation to a temperature, for easier crystallization, of the glass transition point (the fusing point or lower) or higher. It is retained for a given time so that the crystallizing operation is effected. In this manner, the recording mark, namely, the already written signal information, is erased. In the reproducing operation, variation in the reflection light quantity from the recording thin film is detected with the photo diode as in the above described postscript type disc.

In the phase change recording disk capable of recording, reproducing and overwriting operations, a chalcogen material such as Ge15Te81Sb2S2 or the like proposed by U.S. Pat. No. 3,530,441 to S. R. Ovshinsky and or a material with a chalcogen element such AS2 S3, As2 Se3, Sb2 Se3 or the like and elements of group V or group IV of the periodic table being combined are widely known as the recording thin film material.

As the recording thin film is repeatedly heated and cooled as described hereinabove, a protective layer composed of a dielectric superior in heat-proof property is normally provided on the top and bottom faces thereof. As the temperature rising, sudden cooling and slow cooling characteristics vary in the recording thin film by the thermal conduction characteristics of such a protective layer, the recording and erasing characteristics can be improved by the choice of the quality and the layer construction.

As the recording and erasing operations are repeated when the overwrite type disc by the phase change recording system is used, the number of the phase changes in the recording thin film is extremely increased, thus causing inconveniences in that the signal quality necessary to the information reading operation varies. The strict thermal operation of quickly heating the recording thin film to 4000° C. or more, and thereafter, quickly effecting a cooling operation is repeated by the irradiation of the recording spot lights and the erasing spot lights composed of laser lights. The recording thin film itself and a protective layer provided on the top and bottom faces thereof are thermally damaged. Further, such protective layer is repeatedly expanded and contracted so as to effect a pulsating operation. The film thickness change of the recording thin film is caused so as to make the recording condition unequal.

In order to remove the above described inconveniences, it is proposed that a so-called thick film structure of mechanical strength be made higher by the smaller thermal capacity with the film thickness of the recording thin film being made thinner and the film thickness of the protective layer provided on the top, bottom faces thereof being made thicker. In the countermeasure, a phenomenon where the heat is confined in the protective layer is caused by many recording and erasing operations because of the thicker film structure. As a result, the signal quality is deteriorated because of the heat.

SUMMARY OF THE INVENTION

Accordingly, the present invention has been developed with a view to substantially eliminating the above discussed drawbacks inherent in the prior art and has for its essential object to provide an improved optical recording medium.

Another important object of the present invention is to provide an optical recording medium which is superior in recording and erasing characteristics and stable in repeating characteristics.

In accomplishing these and other objects, according to the first and second inventions, the first and second inventions are characterized in that the first and second dielectric layers are formed on both the sides of the recording layer where the energies are absorbed by the irradiation of the laser lights so as to effect recording and erasing operations, and further, a third dielectric layer which is smaller in linear expansion coefficient than the first and second dielectric layers is provided on at least one external side thereof.

A third invention is characterized in that the above described third dielectric layer is made of a material having the linear expansion coefficient of $3 \times 10-6K-1$ or lower.

A fourth invention is characterized in that the sum of the film thickness of the above described second dielectric layer and the third dielectric layer is 30 nm or lower and is thinner than the film thickness of the first dielectric layer.

A fifth invention is characterized in that the film thickness of the above described second dielectric layer is 10 nm or lower and is thinner than the film thickness of the third dielectric layer.

A sixth invention is characterized in that the above described third dielectric layer is composed of oxide, nitride or carbide material.

A seventh invention is characterized in that the above described third dielectric layer is composed of a $SiO_2$ material.

An eighth invention is characterized in that the above described first and second dielectric layers are principally composed of metallic chalcogen zinc and oxide.

A ninth invention is characterized in that the above described first and second dielectric layers are principally composed of metallic chalcogen zinc and nitride.

A tenth invention is an optical recording medium described in the claim 1, where the above described first and second dielectric layers are composed of a mixing film of ZnS and $SiO_2$, with the compounding ratio of the $SiO_2$ being 5 through 40 mol %.

An eleventh invention is characterized in that the above described recording thin film layer contains three components of at least Te, Ge and Sb.

A twelfth invention is characterized in that an optical recording medium has, sequentially formed on one face of the transparent basic plate, the first dielectric layer, a recording thin film layer having a quality for making the condition amorphous by absorption of the energies with the irradiation of the laser lights to effect temperature rising, fusing, further quenching operations, and a quality for raising the temperature of the above described amorphous condition with the irradiation of the laser lights so as to effect a crystallizing operation, a second dielectric layer composed of a material the same as that of at least the above described first dielectric layer, a third dielectric layer which is not soluble in solid with respect to the above described second dielectric layer, a reflection layer, the above described second dielectric layer has the distribution grade of component composition provided in the film thickness direction.

A thirteenth invention is characterized in that the first and second dielectric layers in the eleventh invention are composed of a material with metallic chalcogen zinc and oxide being provided as the principal components.

A fourteenth invention is characterized in that the first and second dielectric layers in the eleventh invention are composed of a material with the metallic chalcogen zinc and nitride being provided as principal components.

A fifteen invention is characterized in that the second dielectric layer of the eleventh invention has the distribution ratio of the oxide, as the composition component, added in a direction away from the recording thin film layer, a distribution grade is provided so that the distribution ratio of 100% may be provided in the boundary face and its vicinity with respect to the reflection layer.

A sixteenth invention is characterized in that the second dielectric layer of the eleventh invention has the distribution ratio of the nitride, as the composition component, added in a direction away from the recording thin film layer, a distribution grade is provided so that the distribution ratio of 100% may be provided in the boundary face and its vicinity with respect to the reflection layer.

A seventeenth invention is characterized in that oxide as a composition component of the first and second dielectric layers in the eleventh invention is $SiO_2$.

An eighteenth invention is characterized in that first and second dielectric layers in the eleventh invention are composed of a mixing film of ZnS and $SiO_2$, the compounding ratio of the $SiO_2$ is 5 through 40 mol %.

A nineteenth invention is characterized in that the recording thin film layer in the eleventh invention contains three components of at least Te, Ge, Sb.

According to the above described first through eleventh inventions, the optical recording medium has a first dielectric layer, a recording thin film layer containing three components of at least Te, Ge and Sb, a second dielectric layer, a third dielectric layer, a reflection layer formed in a laminated condition sequentially on one face of the transparent basic plate.

The above described first and second dielectric layers are composed of a material with chalcogen zinc, which is a metallic chalcogen zinc lower in thermal conduction ratio, and oxide or nitride being provided as principal components or are composed of a mixing film of ZnS and $SiO_2$ (compounding ratio of $SiO_2$ is 5 through 40 mol %). Therefore, the recording thin film layer is grasped between the first and second dielectric layers, with the thermal change characteristics, namely, the recording sensibility, being adjusted.

The sum, in the film thickness, of the above described second dielectric layer and the third dielectric layer is thinner than the film thickness of the first dielectric layer, and is formed to 30 nm or lower. Therefore, the separation between the recording thin film layer and the reflection layer becomes closer. The heat caused in the recording thin film layer through the recording and erasing operation is quickly transmitted to the reflection layer and is removed.

The film thickness of the second dielectric layer is thinner than the film thickness of the third dielectric layer and is formed to 10 nm or less. The above described third dielectric layer is composed of oxide, nitride, carbide material or a $SiO_2$ material which is a material having a linear expansion coefficient (linear expansion coefficient of $3 \times 10-6K-1$ or lower) smaller than the first and second dielectric layers. The third dielectric layer restrains the thermal deformation (thermal expansion and contraction) of the second dielectric layer which comes into contact with the recording thin film. The heat caused in the recording thin film is transferred to the third dielectric layer through the second dielectric layer, and thereafter is quickly transferred to the reflection layer which comes into quick contact against the third dielectric layer, and is removed.

According to the above described twelfth through nineteenth inventions, the optical recording medium has a first dielectric layer, a recording thin film layer containing three components of at least Te, Ge and Sb, a second dielectric layer, a third dielectric layer, a reflection layer formed, on one face of the transparent basic plate, sequentially in a laminated condition as described hereinabove.

The above described first and second dielectric layers used here are composed of a material with chalcogen zinc which is a metallic chalcogen lower in thermal conduction ratio and oxide such as $SiO_2$ or the like or nitride being provided as principal components or are composed of a mixing film of ZnS and $SiO_2$ (compounding ratio of $SiO_2$ is 5 through 40 mol %).

The distribution grade of the component composition is provided in the film thickness direction about the second dielectric layer. Assume that the chalcogen zinc and the $SiO_2$ are concretely the composition components of the recording thin film, the distribution ratio of the $SiO_2$ increases in a direction away from the recording thin film layer. A continued distribution grade is provided so that the distribution ratio may become 100% on the boundary face and its vicinity with respect to the reflection layer and its vicinity. The chalcogen compound composed of similar components becomes rich in condition in the second dielectric layer near the boundary and its vicinity with respect to the recording thin film containing three components of Te, Ge and Sb. The $SiO_2$ smaller in the linear expansion coefficient becomes rich in condition in a direction of keeping away from the recording thin film layer. The thermal deformation of the second dielectric layer is relieved from being caused by the heat generated in the recording thin film layer through the recording and erasing operations. Fatigue breakdown becomes hard to cause. The distribution grade is varied so that the recording sensitivity can be adjusted.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
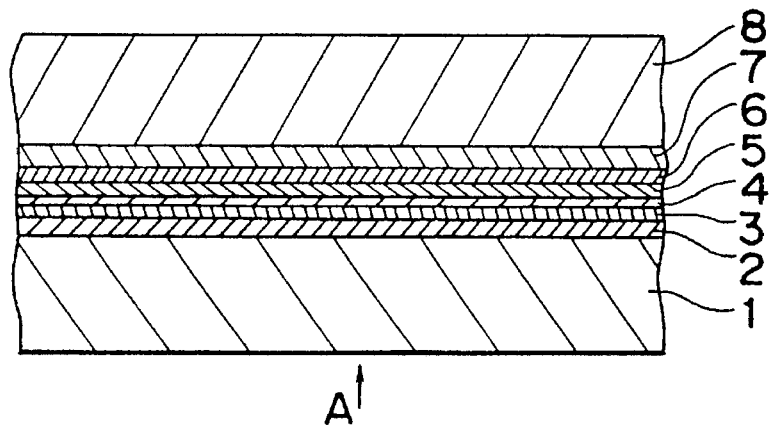
FIG. 1 is a longitudinally sectional view showing the construction of the optical recording medium in accordance with the present invention.

Before the description of the present invention proceeds, it is to be noted that like parts are designated by like reference numerals throughout the accompanying drawings.

One embodiment of the present invention will be described concretely in accordance with the drawings. FIG. 1 is a longitudinally sectional view showing the construction of the optical recording medium in accordance with the present invention. The optical recording medium is composed of multi-layer construction as shown in the drawing, and receives the irradiation of the laser lights modulated in strength in accordance with the information from the direction shown with an arrow A so that the recording, erasing and reproducing operations are effected. A basic plate 1 made of a transparent resin material such as polycarbonate resin or the like, a first dielectric layer 2 made of a mixed film of $ZnS$-$SiO_2$ superior in heat-proof property with the film thickness being approximately 150 nm, a recording thin film layer 3 made of Te—Ge—Sb with the film thickness being approximately 30 nm, a second dielectric layer 4 made of the same material as the first dielectric layer 2 with the film thickness being approximately 10 nm, a third dielectric layer 5 made of $SiO_2$ smaller in the linear expansion coefficient than the second dielectric layer 4 with the film thickness being approximately 20 nm, a reflection layer 6 made of Al alloy with the film thickness being approximately 100 nm, a bonding agent layer 7, and a protective plate 8 are formed a layer-built condition from the bottom in the direction shown with an arrow A in the drawing.

The basic plate 1 may be a resin basic plate with a groove for laser light guiding use being formed in advance, a glass plate basic plate with a groove being formed with a 2P method with 2 P method or a glass plate basic plate with a groove being formed directly in the glass plate. A vacuum evaporating method or a sputtering method may be used as a method of forming the first dielectric layer 2, the recording thin film layer 3, the second dielectric layer 4, the third dielectric layer 5 and the reflection layer.

(Experiment)

(1) On the film thickness of the second dielectric layer 4 and the third dielectric layer 5.

The film thickness of the second dielectric layer 4 was good in recording sensitivity in the range of 3 through 10 nm.

The range of 15 through 25 nm was proper in the film thickness when the $SiO_2$ was used as the third dielectric layer 5. When the film thickness was made 15 nm or lower, the second dielectric layer 4 was thermally expanded and contracted by the recording and erasing operation so that the deformation could not restrained. When the film thickness was made 30 nm or more, the heat was confined in the third dielectric layer 5 portion by the recording and erasing operations, thus resulting in deteriorated multi-cycle characteristics.

When the sum, in the film thickness, of the second and third dielectric layers 4 and 5 was made approximately 30 nm, the thermal transfer to the reflection layer 6 was good so that the recording thin film 3 was effectively quenched. Consequently, inferior recording was not caused, thus resulting in no noises caused.

(2) On compounding ratio of $SiO_2$ in ZnS—$SiO_2$ mixing film of forming the first and second dielectric layers 2, 4.

In 5 mol % or lower, an effect of making the crystal granular diameter smaller was reduced. In 40 mol % or more, the quality of the $SiO_2$ film became larger so that the film strength was not sufficient. Therefore, the range of 5 through 40 mol % can be said to be proper in molecular ratio of the $SiO_2$.

(3) On overwrite characteristics

A disc of 130 mm in outer diameter, 1800 rpm rotation, and 8 m per second in linear speed was formed by an optical recording medium shown in the present embodiment so as to measure the overwrite characteristics of a signal of f1=3.43 MHz and a signal of f2=1.25 MHz. The overwrite was effected by a simultaneous erasing method of forming an amorphous recording mark at a high power level, with a modulation between 16 mW at a high power level and 8 mW at a low power level, by the approximately 1 μm of laser lights with one circle spot, crystallizing the amorphous recording mark at a low power level, effecting an erasing operation.

As a result, a value of 55 dB or more was obtained as the C/N ratio (estimation measure of noise) of the recording signal. Also, a value of 30 dB or more was obtained as an overwrite erasing ratio and the recording erasing characteristics were improved as compared with the conventional optical recording medium.

Bit error and rate characteristics were measured so that deterioration could not be seen at 106 cycle or higher in the cycle characteristics of the overwrite.

Figure 2:
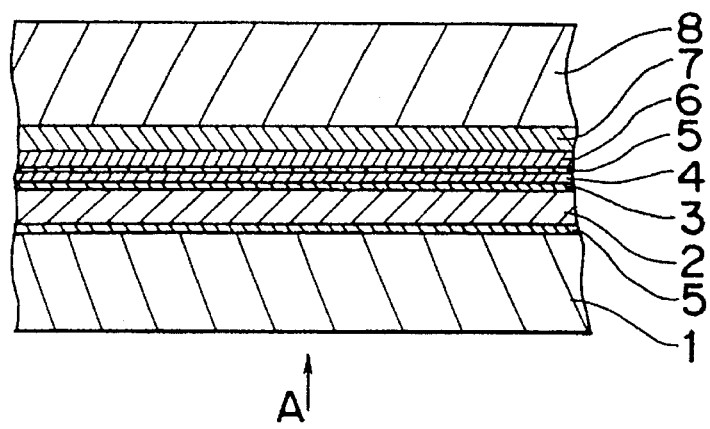
FIG. 2 is a longitudinally sectional view showing a second embodiment of the construction of the optical recording medium in accordance with the present invention.

FIG. 2 is a longitudinally sectional view showing a second embodiment of the construction of the optical recording medium. The same components shown in FIG. 1 are designated by the same numerals through the accompanying drawings. The difference between FIG. 2 and FIG. 1 is that a third dielectric layer made of $SiO_2$ of approximately 20 nm in film thickness is provided with respect to the first dielectric layer 2 made of the disc basic plate 1 and ZnS-Si. The duty of the $SiO_2$ is to quickly release the heat of the first dielectric layer 2 at the recording and erasing time with a higher thermal conduction ratio, through the $SiO_2$ of the low linear expansion rate, and in the face direction. Therefore, the thermal stress of the dielectric layer 2 can be reduced. Further, the disc basic plate 1 can be prevented from being deformed through expansion, contraction or the like with the heat of the record erasing time so that the cycle characteristics of the recording and erasing are improved.

Figure 3:
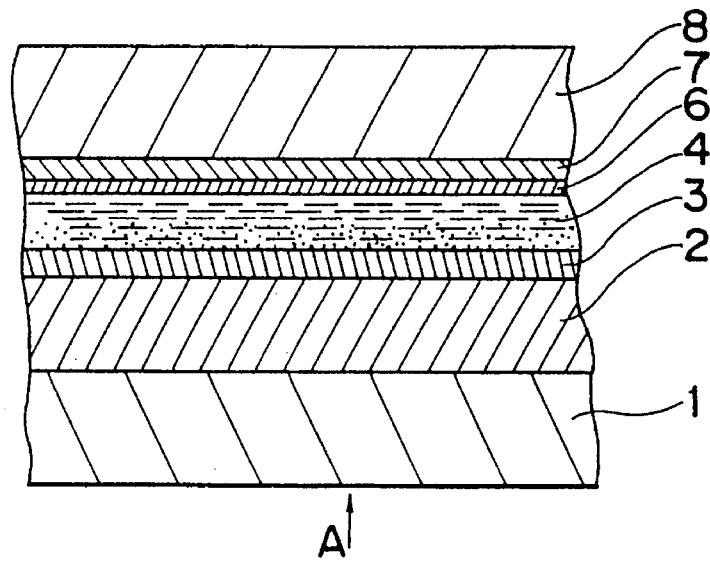
FIG. 3 is a longitudinally sectional view showing a third embodiment of the construction of the optical recording medium in accordance with the present invention.

FIG. 3 is a longitudinally sectional view showing a third embodiment of the construction of the optical recording medium. The same components shown in FIG. 1 are designated by the same numerals through the accompanying drawings. The difference between FIG. 3 and FIG. 1 is that the film thickness of the second layer 4 is made larger by a portion where a third dielectric layer 5 is absent, and further, the composition ratio between the ZnS and the $SiO_2$ is varied continuously in the film thickness direction. Concretely, ZnS is made to be 80% and $SiO_2$ to be 20% on the boundary face in contact with the recording thin film layer 3. The $SiO_2$ is formed to become 100% on the boundary face with respect to the reflection layer 6. It is needless to say that the composition is not restricted to such one. The thermal conduction ratio of the recording thin film layer 3 can be controlled by the change in the composition ratio. Namely, the recording sensitivity can be adjusted. It was confirmed by the results of the experiment even in the embodiment that the above described overwrite characteristics could be satisfied.

As is clear form the foregoing description, according to the arrangement of the present invention, a pulsating phenomenon where dielectric layer provided on the top and bottom of the recording thin film layer are thermally expanded, and contracted through the recording and erasing so that an inferior phenomenon of moving the recording thin film layer along the guiding groove in the disc rotating direction is considerably restrained. Therefore, uneven thickness in the recording thin film layer is removed, thus making it possible to prevent the signal quality from being deteriorated. As a result, the repeating characteristics of the recording and erasing operations are exceptionally improved.

As the equal amorphous, namely, equal recording mark can be formed, because of exceptional improvement in the quenching effect of the recording thin film layer, with the thickness of the dielectric layer provided between the recording thin film layer and the reflection layer being made thinner. Therefore, the recording and erasing characteristics in the optical recording medium become extremely better. As a result, an optical recording medium superior in durability which is capable of 106 rewriting operations or more can be effected.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included herein.

What is claimed is:

1. An optical recording medium which records on the basis of phase transformation, sequentially formed on one face of a transparent basic plate, comprising:

a first protection layer consisting of a mixture of ZnS and $SiO_2$ formed on said face of the transparent basic plate;

a recording thin film layer formed on the first protection layer which records on the basis of a phase transformation;

a second protection layer consisting of a mixture of ZnS and $SiO_2$ formed on the recording thin film layer;

a third protection layer of $SiO_2$ formed on the second protection layer;

a reflection layer formed on the third protection layer; and wherein the third protection layer is harder than the second protection layer and has a smaller linear expansion coefficient than the first and second protection layers, the sum of the thickness of the second protection layer and the third protection layer is less than 30 nm, and is less than the thickness of the first protection layer, and wherein the second protection layer has a thickness of less than 10 nm, and is less than the thickness of the third protection layer.

2. An optical recording medium which records on the basis of a phase transformation, sequentially formed on one face of a transparent basic plate, comprising:

a first protection layer formed on said face of the transparent basic plate;

a recording thin film layer formed on the first protection layer which records on the basis of a phase transformation by assuming an amorphous condition when heated to melting by a laser and rapidly cooled, and is changed to a crystalline condition from the amorphous condition when heated by a laser and gradually cooled;

a second protection layer formed on said recording thin film layer, made of the same material as that of said first protection layer;

a third protection layer formed on said second protection layer;

a reflection layer formed on said third protection layer; and wherein the third protection layer is harder than the second protection layer and has a smaller linear expansion coefficient than the first and second protection layers, the sum of the thickness of the second protection layer and the third protection layer is less than 30 nm, and is less than the thickness of the first protection layer, and wherein the second protection layer has a thickness of less than 10 nm, and is less than the thickness of the third protection layer.

* * * * *